(12) United States Patent
Sundararajan et al.

(10) Patent No.: US 9,094,326 B2
(45) Date of Patent: Jul. 28, 2015

(54) SYSTEMS AND METHODS FOR COMMUNICATING IN A NETWORK

(75) Inventors: Jay Kumar Sundararajan, San Diego, CA (US); Debessay Fesehaye Kassa, San Diego, CA (US); Gerardo Giaretta, San Diego, CA (US); David William Craig, San Diego, CA (US); Julien H. Laganier, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 13/286,541

(22) Filed: Nov. 1, 2011

(65) Prior Publication Data

US 2012/0106342 A1    May 3, 2012

Related U.S. Application Data

(60) Provisional application No. 61/409,474, filed on Nov. 2, 2010.

(51) Int. Cl.
    *H04L 12/801* (2013.01)
    *H04L 12/851* (2013.01)
    *H04L 12/807* (2013.01)

(52) U.S. Cl.
    CPC .......... *H04L 47/2441* (2013.01); *H04L 47/193* (2013.01); *H04L 47/27* (2013.01)

(58) Field of Classification Search
    CPC ........ H04I 47/10; H04I 12/5602; H04I 47/27; H04I 2012/5635; H04I 2012/5636; H04I 47/35; H04I 47/30; H04I 47/32; H04I 43/50; H04I 43/026; H04W 24/00
    USPC .............. 370/231, 232, 235, 252, 254, 395.4, 370/395.41
    See application file for complete search history.

(56) References Cited

U.S. PATENT DOCUMENTS

| 7,395,361 | B2 | 7/2008 | Schaffer et al. |
| 7,426,181 | B1 * | 9/2008 | Feroz et al. ............ 370/232 |

(Continued)

FOREIGN PATENT DOCUMENTS

| CN | 1672142 A | 9/2005 |
| JP | 2002237841 A | 8/2002 |

(Continued)

OTHER PUBLICATIONS

Damon Wischik et al., "Design, implementation and evaluation of congestion control for multipath TCP", University College London, pp. 1-14.

(Continued)

*Primary Examiner* — Un C Cho
*Assistant Examiner* — Natali N Pascual Peguero
(74) *Attorney, Agent, or Firm* — Abdollah Katbab

(57) ABSTRACT

Systems and methods for prioritizing transmission control protocol (TCP) flows for communication devices in a network are described herein. The systems and methods herein may further allocate bandwidth to the flows based on the priority of the flows. Further, the systems and methods herein allow devices to determine whether particular flows share a traffic flow constraint or bottleneck that limits the overall available bandwidth to the flows. Therefore, allocation of bandwidth for one flow may be adjusted based on allocation of bandwidth to another flow if the flows share a traffic flow constraint. Further, the systems and methods herein allow for target data rates to be determined for the flows based on shared traffic flow constraints.

28 Claims, 5 Drawing Sheets

(56) References Cited

U.S. PATENT DOCUMENTS

| | | | |
|---|---|---|---|
| 7,688,853 B2* | 3/2010 | Santiago et al. | 370/468 |
| 7,760,642 B2* | 7/2010 | Plamondon | 370/235 |
| 7,787,379 B2* | 8/2010 | Mekkattuparamban et al. | 370/235 |
| 7,860,004 B2* | 12/2010 | Spatscheck et al. | 370/231 |
| 8,265,019 B2 | 9/2012 | Madan et al. | |
| 2004/0030797 A1 | 2/2004 | Akinlar et al. | |
| 2004/0066746 A1 | 4/2004 | Matsunaga | |
| 2008/0181108 A1 | 7/2008 | Hashmi et al. | |
| 2009/0073968 A1* | 3/2009 | Bishop et al. | 370/386 |
| 2009/0122717 A1 | 5/2009 | Das et al. | |
| 2010/0226250 A1 | 9/2010 | Plamondon | |

FOREIGN PATENT DOCUMENTS

| | | |
|---|---|---|
| JP | 2003198611 A | 7/2003 |
| JP | 2007013449 A | 1/2007 |
| JP | 2008536356 A | 9/2008 |
| JP | 2010226455 A | 10/2010 |
| TW | I293232 B | 2/2008 |
| WO | 2007024677 A2 | 3/2007 |
| WO | 2009061778 | 5/2009 |
| WO | 2009061794 | 5/2009 |
| WO | 2010041469 A1 | 4/2010 |
| WO | 2010073671 A1 | 7/2010 |

OTHER PUBLICATIONS

Hsieh, et al., "A receiver-centric transport protocol for mobile hosts with heterogeneous wireless interfaces," MobiCom '03 Proceedings of the 9th annual internaitonal conference on Mobile computing and networking, 2003, pp. 1-15.

International Search Report and Written Opinion—PCT/US2011/059022—ISA/EPO—Jan. 23, 2012.

Jagannathan, et al., "Stateless Proportional Bandwidth Allocation", Internet Performance and Control of Network Systems III, Jul. 1, 2002, vol. 4865, pp. 25-36, XP002666914, DOI: 10.1117/12.473403, Retrieved from the Internet: URL:http://spie.org/x648.html"product_id=473403 [retrieved on Jan. 10, 2012].

Jeong S-H, et al., "QOS support for UDP/TCP based networks", Computer Communications, Elsevier Science Publishers BV, Amsterdam, NL, vol. 24, No. 1, Jan. 1, 2001, pp. 64-77, XP004227542, ISSN: 0140-3664, DOI: 10.1016/S0140-3664(00)00290-5.

Mehra, et al., "Receiver-driven bandwidth sharing for TCP and its applicaiton to video streaming," IEEE Transactions on Multimedia, 2005, vol. 7, No. 4, pp. 740-752.

Mehra, et al., "Receiver-driven bandwidth sharing for TCP," INFOCOM 2003. IEEE Societies Twenty-Second Annual Joint Conference of the IEEE Computer and Communications, 2003, vol. 2, pp. 1145-1155.

Obata, et al., "A TCP congestion control method for securing stable throughput," 7th Asia-Pacific Symposium on Information and Telecommunication Technologies, 2008, pp. 109-114.

Yang, et al., "General AIMD congestion control, Proceedings 2000 International Conference on Network Protocols," 2000, pp. 187-198.

Taiwan Search Report—TW100139974—TIPO—Jan. 14, 2014.

* cited by examiner

SYSTEMS AND METHODS FOR COMMUNICATING IN A NETWORK

CROSS REFERENCE TO RELATED APPLICATIONS

Claim of Priority Under 35 U.S.C. §119

The present application for patent claims priority to U.S. Provisional Patent Application No. 61/409,474, entitled "SYSTEMS AND METHODS FOR COMMUNICATING IN A NETWORK," filed Nov. 2, 2010, the entirety of which is expressly incorporated by reference herein.

BACKGROUND

1. Field

The present application relates generally to communications, and more specifically to prioritizing transmission control protocol (TCP) flows for communication devices in a network.

2. Background

Communication systems are widely deployed to provide various types of communication (e.g., voice, data, multimedia services, etc.) between communication devices (e.g., mobile handsets, PDAs (Personal Data Assistants), personal computers, smart phones, servers, or any other electronic device capable of communicating via a network). The devices may transmit/receive data between each other via a network of interconnected devices. The data may be sent as different sets of data referred to as flows. For example, communication of a first video stream between a device and another device may be referred to as a first flow, and communication of data packets for a web page between a device and another device may be referred to as a second flow. These data flows may each be associated with a particular application running on the communications device.

Further, the devices are interconnected by wired or wireless connections. The devices may access one or more of these connections via one or more network interfaces. These connections and/or network interfaces may have a finite amount of bandwidth that they are capable of handling. Therefore, there may be a finite available amount of bandwidth for a device to use to communicate. Accordingly, when multiple flows request to use the available bandwidth, the bandwidth can be distributed between flows. Communication of flows of data in the network and allocation of bandwidth to the flows is handled in part by the transmission control protocol (TCP).

Typically, TCP distributes the available bandwidth evenly between the flows. However, different flows may have different minimum throughput requirements and different maximum desired throughputs in order for the application to work well. For example, a video stream flow may require a minimum bandwidth in order for the video to playback in the application smoothly and accurately. Merely evenly distributing available bandwidth between the flows does not ensure the video stream flow is allocated the required minimum bandwidth. Even when minimum and maximum throughput requirements of different flows are equal or unknown, the user may have specific interest in one flow. For example, when a flow is in foreground, the user may pay attention to the respective application, and therefore may desire prioritization of that flow. More generally, different flows may have different requirements, for example intrinsic requirements based on the nature of each flow, or relative to the context in which the device is used. Thus, enhanced systems and methods of bandwidth between flows are needed.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include prioritizing transmission control protocol (TCP) flows for communication devices in a network.

One embodiment of the disclosure provides a device operative in a communication network. The device includes a processor. The processor is configured to identify a set of flows from a plurality of flows based on a shared traffic flow constraint. The set of flows includes a first flow and a second flow. The processor is further configured to allocate bandwidth to each of the flows in the set of flows based on the traffic flow constraint and an available bandwidth associated with the traffic flow constraint.

Another embodiment of the disclosure provides a method operative in a device operative in a communication network. The method includes identifying a set of flows from a plurality of flows based on a shared traffic flow constraint. The set of flows includes a first flow and a second flow. The method further includes allocating bandwidth to each of the flows in the set of flows based on the traffic flow constraint and an available bandwidth associated with the traffic flow constraint.

Yet another embodiment of the disclosure provides a device operative in a communication network. The device includes means for identifying a set of flows from a plurality of flows based on a shared traffic flow constraint. The set of flows includes a first flow and a second flow. The device further includes means for allocating bandwidth to each of the flows in the set of flows based on the traffic flow constraint and an available bandwidth associated with the traffic flow constraint.

Another embodiment of the disclosure provides a computer program product including a non-transitory computer-readable medium. The computer-readable medium includes code for causing a computer to identify a set of flows from a plurality of flows based on a shared traffic flow constraint. The set of flows includes a first flow and a second flow. The computer-readable medium further includes code for causing a computer to allocate bandwidth to each of the flows in the set of flows based on the traffic flow constraint and an available bandwidth associated with the traffic flow constraint

DETAILED DESCRIPTION

Figure 1:
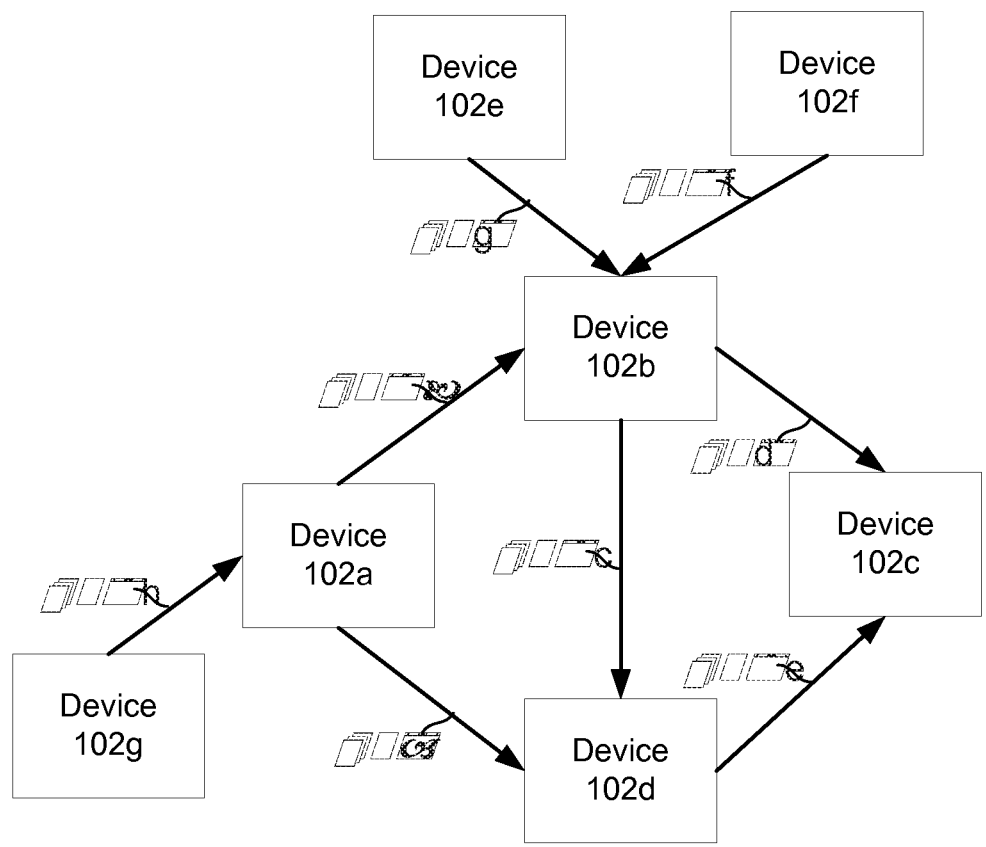
FIG. 1 illustrates an exemplary communication network.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, Local Area Networks (LAN), Personal Area Networks (PAN), Wide Area Networks (WAN), wired networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.9, IEEE 802.16, IEEE 802.20, Flash-OFDM", etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA) utilizes single carrier modulation and frequency domain equalization. SC-FDMA has similar performance and essentially similar overall complexity as an OFDMA system. An SC-FDMA signal has lower peak-to-average power ratio (PAPR) because of its inherent single carrier structure. SC-FDMA has drawn significant attention, especially in uplink communications where lower PAPR greatly benefits the mobile terminal in terms of transmit power efficiency. It is currently a working assumption for an uplink multiple access scheme in 3GPP Long Term Evolution (LTE), or Evolved UTRA (E-UTRA).

Systems and methods are described herein that allow for prioritizing flows for a device in a network. The systems and methods described herein relate to prioritizing outgoing flows (flows of traffic sent from the device to another device via the network) and also relate to prioritizing incoming flows (flows of traffic received by the device from another device via the network). Accordingly, different flows can be throttled or provided more aggressive bandwidth parameters in response to packet losses sufficient to allow applications on the device that rely on the data flows to function properly A flow refers to a set of data or packets transmitted or received by an application running on a device. Although flows may be described herein with reference to TCP connections, they are not so limited. In various embodiments, flows may include any transport protocol or socket type such as, for example, TCP, SCTP, UDP, raw IP, etc. Moreover, flows may be associated with an application. For example, a flow may refer to the data sent over a TCP connection formed between a sending application and a receiving application running on devices 102. Arriving TCP data packets are identified as belonging to a specific TCP connection by its sockets, that is, the combination of source host address, source port, destination host address, and destination port. Each device may assign a TCP port to the TCP connection over which the flow of data is transmitted/received. Accordingly, flows may be allocated different bandwidths by adjusting the parameters associated with the TCP connections of each of the flows.

One or more applications on one device may each form one or more TCP connections with each of one or more additional applications on one or more other devices. Accordingly, an application may have one or more outgoing flows and one or more incoming flows, each of which refer to different data sets and are associated with different TCP connections. For example, transmission of a first video stream by a first device to a second device may be referred to as a first outgoing flow of the first device. Further, reception of the first video stream by the second device from the first device may be referred to as a first incoming flow of the second device. Additionally, transmission of data packets for a web page from the first device to the second device may be referred to as a second outgoing flow of the first device. Reception of data packets for the web page by the second device from the first device may be referred to as a second incoming flow of the second device.

The systems and methods described herein relate to computing target rates for different flows associated with a device based on the bandwidth available to the device. The systems and methods described herein further relate to identifying flows that share resources to determine whether the use of bandwidth by one flow affects the available bandwidth for another flow. The systems and methods described herein further relate to enforcing priority of allocation of bandwidth to flows based on adjusting TCP parameters. It should be noted that though some examples herein discuss only two flows, one of ordinary skill in the art will recognize that the principles described with respect to two flows also apply to embodiments with a plurality of flows N, wherein N is any positive integer.

FIG. 1 illustrates an exemplary communication network 100. The communication network 100 (e.g., the Internet, a LAN, a PAN, a WAN, etc.) is configured to support communication between a number of communication devices 102a-102g (e.g., mobile handsets, PDAs (Personal Data Assistants), personal computers, smart phones, servers, or any other electronic device capable of communicating via a network). The communication devices 102a-102g may be interconnected by one or more wired or wireless communications links 104a-104h. The communications links 104a-104h may include one or more of the following types of communications links: GSM (Global System for Mobile communications), UMTS (Universal Mobile Telecommunications System), UMTS-TDD (UMTS-Time Division Duplexing), CDMA (Code Division Multiple Access), CDMA2000, WCDMA (Wideband CDMA), TDMA (Time Division Multiple Access), FDMA (Frequency Division Multiple Access), 1xEV-DO (Evolution-Data Optimized), Wi-Fi, Wi-Max, Bluetooth, or IEEE 802.11, telephone (e.g., POTS), cable, Ethernet, PLC (Power Line Communication), or fiber optic links, or any other link that allows a connection between devices. It should be noted that the network 100 may include more or less communication devices 102, and that there may be a different arrangement of links 104 between the communication devices 102.

Each of the communication devices 102a-102g may communicate with other devices via one or more of the links 104a-104h. For example, communication device 102a may communication with communication device 102d via link 104a and/or the combination of communication links 104b and 104c. For example, the device 102a may run an application (e.g., a web browser, a video player, an e-mail client, or another other application) that transmits to and/or receives data (e.g., data packets for a web browsing session, data packets for a Voice Over IP (VoIP) call, data packets for a video stream, or other data or media content) from the device 102d. The device 102a may also run additional applications and transmit data to and/or receive data from device 102d and/or other devices 102.

Each device 102a-102g may be constrained in the amount of data it can transmit and/or receive over one or more links. This constraint may be due to physical constraints of the device (e.g., constraints of a network interface of the devices) and/or the links or some other constraints. Accordingly, there is a finite amount of bandwidth available for each device 102a-102g can transmit and/or receive data. In some embodiments, the available bandwidth for transmitting data is related to the available bandwidth for receiving data. In other embodiments, the available bandwidth for transmitting data is unrelated to the available bandwidth for receiving data. Accordingly, when a device transmits/receives multiple flows, the available bandwidth needs to be allocated between the multiple flows.

Different flows may have different minimum throughput requirements and different maximum desired throughputs based on the application associated with the flow. For example, a video stream flow may require a minimum bandwidth in order for the video to playback in the application smoothly and accurately as the data needs to be received sequentially and within a certain time period for live playback. On the other hand, a flow containing data packets for a web page may not require a minimum bandwidth as the web page can be rendered whenever all the packets are received. Accordingly, bandwidth should be allocated to the flows of each device 102a-102g based on the requirements of the flow.

Further, different flows may have different priorities. For example, one flow may be associated with an important application that should be allocated the minimum require bandwidth before allocating bandwidth to another flow any bandwidth or one flow may be associated with an application which is in foreground in the graphical user interface and therefore likely considered high priority by the user. Flows may be prioritized by many different methods. The priority levels may be absolute priority levels where each flow is given a specific priority value (e.g., 1, 2, 3, etc.) Alternatively the priority levels may be relative where a priority level of one flow is defined relative to another flow (e.g., the priority of flow 1 is higher than the priority of flow 2 and/or lower than the priority of flow 3). Further, the priority levels may be assigned to the flows by many different methods. For example, an application that uses the flow may request a particular priority level for the flow from an operating system or manager application of the device that controls the flows, such as by using an application programming interface (API). Alternatively, the flow may be automatically assigned a particular flow by the device based on some parameter such as the type of application (e.g., web browsers are assigned a lower priority than video players). In another embodiment, a user of the device can set the priority level for a flow.

In an embodiment, each of the devices 102a-102g may utilize TCP to perform congestion control and thus assign indirectly resources to the different flows. At the sender device side, TCP uses window scaling to control the bandwidth allocated to flows for transmitting/receiving data. Window scaling functions by setting a congestion window size, which is the number of packets that can be transmitted from a transmitter to a receiver without acknowledgment from the receiver being received by the transmitter, for a given flow. The time it takes for a data packet to be sent from the transmitter to the receiver and an acknowledgement to be received by the transmitter from the receiver is referred to as the round trip time (RTT). Increasing the congestion window size for a flow increases the bandwidth available to the flow by allowing more data to be sent per RTT.

In an embodiment, TCP sets an initial congestion window size for the flow, which amounts to a particular bandwidth. TCP then scales the congestion window size based on the loss of data packets as follows. If the data packets of a flow are transmitted by a transmitter to a receiver successfully, and the acknowledgement is received by the transmitter, the congestion window size is increased by an amount a (an increase parameter), which is added to the current congestion window size. If one or more data packets of a flow are transmitted by a transmitter to a receiver unsuccessfully, and a plurality of acknowledgements (i.e., duplicate acknowledgements) requesting the same unsuccessfully transmitted data packet(s) are received by the transmitter, the congestion window size is decreased by a factor $\beta$ (a decrease parameter), which is a value between 0 and 1 that is multiplied with the current congestion window size. The values $\alpha$ and $\beta$ are used by the transmitter to adjust the congestion window size as discussed below.

In an embodiment, TCP initially allocates equal amounts of bandwidth to each flow in a device 102 by setting the congestion window size to an equal default value for each flow. However, in order to prioritize one flow over another and allocate greater bandwidth to a given flow, the parameters $\alpha$ and $\beta$ for controlling the change in congestion window size can be adjusted differently for different flows. Accordingly, the congestion window size for different flows will change at different rates, leading to different congestion window sizes for different flows.

As described herein, bandwidth allocation can include direct bandwidth allocation, such as by QoS mechanisms, and indirect bandwidth allocation. As an example of indirect bandwidth allocation, a UDP flow and a TCP flow may saturate a network connection. By throttling the TCP flow, the UDP flow may be indirectly allocated more bandwidth. By providing aggressive bandwidth parameters to the TCP flow (as described in more detail below), the UDP flow may be indirectly allocated less bandwidth. Therefore, allocating bandwidth can include adjusting network parameters (such as the TCP parameters described herein), such that one or more flows are throttled, given aggressive parameters, prioritized, and/or reprioritized, thereby providing a different amount of bandwidth to one or more other flows.

For example, one method of allocating more bandwidth to a high priority flow includes increasing the parameter $\alpha$ for high priority flows and/or decreasing the parameter $\alpha$ for low priority flows. Normally $\alpha$ is equal to 1. Increasing the parameter $\alpha$ (e.g., to a value greater than 1) causes the congestion window size for the high priority flow to increase more quickly than a flow with a smaller parameter $\alpha$. Further, decreasing the parameter $\alpha$ (e.g., to a value less than 1) causes the congestion window size for a low priority flow to increase more slowly than a flow with a higher parameter α. The congestion window sizes for both the high priority flow and the low priority flow will increase until packets begin to drop. However, the congestion window size of the high priority flow will increase faster than that of the low priority flow due to the different values for α, so the high priority flow will have a larger congestion window size as the congestion window sizes are increased. Accordingly, the high priority flow is allocated a higher bandwidth.

In one embodiment, α associated with the high priority flow is increased and a associated with the low priority flow is decreased. In another embodiment, only a associated with the high priority flow is increased. In yet another embodiment, only a associated with the low priority flow is decreased.

Only decreasing the α of low priority flows has at least one advantage in that third party flows are not unfairly given less bandwidth due to the change in the α parameter. In particular, where a associated with a higher priority flow is increased, the congestion window size increases more quickly not only with respect to known low priority flows, but also with respect to other third party flows that may not be accounted for and have a normal value of α=1. Therefore, these unaccounted for flows may receive less bandwidth than the higher priority flow even though this is not desired. By only decreasing a for lower priority flows, this situation is avoided, since no flow is prioritized over flows having a normal value of α=1.

Another method of allocating bandwidth to a high priority flow includes increasing the parameter β for high priority flows and/or decreasing the parameter β for low priority flows. Normally β is equal to 0.5. Increasing the parameter β (e.g., to a value greater than 0.5) causes the congestion window size for the high priority flow to decrease less than a flow with a smaller parameter β. Further, decreasing the parameter β (e.g., to a value less than 0.5) causes the congestion window size for a low priority flow to decrease more than a flow with a higher parameter β. The congestion window sizes for both the high priority flow and the low priority flow will decrease when packets begin to drop. However, the congestion window size of the high priority flow will decrease less than that of the low priority flow due to the different values for β, so the high priority flow will have a larger congestion window size as the congestion window sizes are decreased. Accordingly, the high priority flow is allocated a higher bandwidth.

In one embodiment, β associated with the high priority flow is increased and β associated with the low priority flow is decreased. In another embodiment, only β associated with the high priority flow is increased. In yet another embodiment, only β associated with the low priority flow is decreased.

Only decreasing the β of low priority flows has at least one advantage in that third party flows are not unfairly given less bandwidth due to the change in the β parameter. In particular, where β associated with a higher priority flow is increased, the congestion window size decreases less not only with respect to known low priority flows, but also with respect to other third party flows that may not be accounted for and have a normal value of β=0.5. Therefore, these unaccounted for flows may receive less bandwidth than the higher priority flow even though this is not desired. By only decreasing β for lower priority flows, this situation is avoided, since no flow is prioritized over flows having a normal value of β=0.5.

It should be noted that how the values of α and β are adjusted can be based on different methods. In an embodiment, the values for α and β may be adjusted based on a heuristic. For example, the values for α and β may be adjusted based on the flow's current rate, target desired rates for the flows, the minimum and maximum rate constraints, and/or capacity constraints.

In one example, α and/or β are adjusted based on target desired rates for the flows of a device according to equations 1 and/or 2 as follows.

$$\alpha_j = \frac{R_j}{\sum_i^N R_i} \left( \sum_i^N \frac{1}{RTT_i} \times 1.0 \right) RTT_j \approx \frac{R_j}{\sum_i^N R_i} (N \times 1.0) \quad (1)$$

$$\beta_j = \frac{R_j}{\sum_i^N R_i} \left( \sum_i^N \frac{1}{RTT_i} \times \frac{1}{2} \right) RTT_j \approx \frac{R_j}{\sum_i^N R_i} \left( N \times \frac{1}{2} \right) \quad (2)$$

wherein:
N=the number of flows 1 to j;
$R_j$=the target data rate for flow j; and
$RTT_j$=the round trip time for flow j.

In one embodiment, the target rate $R_j$ for flow j may be based on the priority of the flow j, the minimum required throughput $R_j^{min}$ for the flow j, the maximum desired throughput $R_j^{max}$ for the flow j, and/or the estimated available bandwidth C for the flows. It should be noted that other methods may be used to set target rates for different flows. In one embodiment, proceeding in decreasing order of priority of flows, the maximum number of flows $N_p$ whose minimum required throughput can be accommodated by C is determined. Then $R_j$ may be calculated by equation 3 as follows.

$$R_j = R_j^{min} + \frac{R_j^{max} - R_j^{min}}{\sum_i^N (R_i^{max} - R_i^{min})} \left( C - \sum_i^{N_p} R_i^{min} \right) \quad (3)$$

Accordingly, each flow is assigned a target rate between its minimum and maximum rate constraint.

At the receiver side, different parameters than α and β may be adjusted to prioritize flows. For example, at the receiver side, a receive window parameter may be may be adjusted for different flows. The receive window size is the amount (number of bytes) of data that a receiver can accept without acknowledgment to the transmitter, for a given flow. For example, higher priority flows may be set with a larger receive window size and/or lower priority flows may be set with a smaller receive window size. The larger receive window allows more data to be received, thus allocating more bandwidth, while a smaller receive window allows less data to be received, thus allocating less bandwidth. In another example, for lower priority flows, transmission of acknowledgement messages may be delayed, thereby increasing the RTT and therefore decreasing the bandwidth allocated. In yet another example, incoming TCP packets for lower priority flows may be dropped by the device lower layer before they are received by the TCP stack, triggering TCP retransmissions and therefore limiting the rate and bandwidth used by the flow. The receive window size and delay of acknowledgement messages may be adjusted based on some heuristic such as based on the flow's current rate, target desired rates for the flows, the minimum and maximum rate constraints, and/or capacity constraints.

It should also be noted that the allocated bandwidth may be adjusted either adaptively or reactively. Adaptive allocation refers to setting the bandwidth by setting the above discussed parameters or other parameters to a particular value associated with the priority level of a flow. For example, a flow may always have parameters α, β, receive window size, and/or acknowledgement delay set to particular value(s) based on an attribute of the flow. For example, different priority levels for flows may map to one or more particular value(s). Further, a flow with a particular requirement (e.g., a particular bandwidth for a flow, a flow that requires a particular latency, a video flow that requires a particular bit rate, etc.) may map to one or more particular value(s). Reactive allocation refers to adjusting the bandwidth by adjusting the above discussed parameters or other parameters to raise or lower values when a particular application or flow is not performing as expected (e.g., a video is stuttering so more bandwidth is allocated). Further, the parameters may be adjusted periodically based on the described techniques, such as after one or more round trip times.

As discussed above, different parameters may be adjusted for different flows to allocate more or less bandwidth to the flows. Further, the adjustment of the parameters can cause a relative change in the allocation of bandwidth between flows. It should be noted, however, that adjustment of the parameters may only change the allocated bandwidth amongst flows when the adjustments are made on flows that share the same limiting factor as the cap on the overall bandwidth available to the flows. This limiting factor, which may be referred to as a bottleneck or a traffic flow constraint, is the single component or resource that limits the overall bandwidth available to a flow.

For example, a flow may utilize several resources such as links, sockets, hardware resources, etc., each of which is associated with a certain throughput or bandwidth. Amongst all the resources used by the flow, the traffic flow constraint is the resource that has the lowest overall bandwidth or throughput. Accordingly, in some embodiments, one or more devices 102 may determine whether flows share the same traffic flow constraint. If flows share the same traffic flow constraint, then both flows essentially share the same overall bandwidth cap and therefore changing the allocation of bandwidth to one flow affects the other flow. However, if flows do not share the same traffic flow constraint, the flows do not share the same bandwidth cap, so changing the allocation of bandwidth to one flow does not necessarily affect the other flow. Therefore, when flows do not share the same traffic flow constraint, reducing the bandwidth available to one flow may not help another flow, while at the same time adversely affects the flow for which the bandwidth is reduced. Accordingly, in some embodiments setting target rates and/or or prioritizing of sets of flows (such as by adjusting TCP parameters) as described above is performed on sets of flows that share a traffic flow constraint.

In one embodiment, one or more devices 102 may detect shared traffic flow constraints for flows by determining whether flows experience congestion events in a synchronized manner. At the transmitter side, the transmitter may determine whether flows: drop packets (e.g., no acknowledgement (ACK) is received or duplicate ACKs are received), have an increase in RTT, have a reduction in the sending rate, or experience some other congestion event at approximately the same time. In some embodiments, such changes may only count as congestion events if they meet a minimum threshold (e.g., rate drops by a threshold amount, a threshold amount of packets are dropped, RTT increases more than a threshold amount, etc.). For example, the transmitter may determine whether after a first flow experiences such a congestion event, a second flow experiences the congestion event within a threshold time period. If the second flow experiences the congestion event with the threshold time period, it can be assumed the flows share the same traffic flow constraint. It should be noted the transmitter may make the determination for additional flows as well.

Similarly, at the receiver side, the receiver may determine whether flows: drop packets (e.g., packet loss determined through loss of packets with certain sequence numbers), have an increase in RTT (e.g., calculated using timestamps), have a reduction in the instantaneous throughput, or experience some other congestion event at approximately the same time. In some embodiments, such changes may only count as congestion events if they meet a minimum threshold (e.g., rate drops by a threshold amount, a threshold amount of packets are dropped, RTT increases more than a threshold amount, etc.). If flows experience a congestion event within a threshold time period of each other, it is assumed the flows share the same traffic flow constraint.

An additional or alternative method for detecting whether flows share a traffic flow constraint at the transmitter and/or receiver side is to determine whether one or more flows are allocated the approximately the expected amount of bandwidth at a given time. For example, it may be determined if two flows are each allocated a fair share of bandwidth if they have the same priority level, or their expected share of bandwidth if they have different priority levels. One method of doing so is to determine whether the actual bandwidth of each flow is within a threshold amount (+/−) of the expected bandwidth for that flow. The expected bandwidth for the flow may be equal to the target rate for the flow such as determined by equation 3 above. If the flows each have the expected bandwidth, it can be assumed that the flows share the same traffic flow constraint. It should be noted the transmitter and/or receiver may make the determination for additional flows as well.

For example, bandwidth allocation may be detected at the transmitter side by determining whether the congestion window for a plurality of flows are within a threshold amount of the expected congestion window value at the time that a packet is dropped for the flows. The time that packets are being dropped is when all the bandwidth has been allocated. One equation for using the congestion window to allocate flows j to the same set as sharing a traffic flow constraint when all flows share the same priority is if $W_j^{[C]} >= W_j^{[sh]}$—tolerance, the flow j is added to the set;

wherein, $W_j^{[C]} = \beta \times W_j^{[LI]}$ = the congestion window after the packet loss;

$W_j^{[LI]}$ = the congestion window when the packet loss occurs;

$W_j^{[sh]} = C/N \times RTT_j$ = the fair share congestion window;

C = the estimated available bandwidth for all the flows N;

N = the number of flows 1 to j; and $RTT_j$ = the round trip time for flow j.

At the receiver side, bandwidth allocation may be detected at the receiver side by determining whether the current receive data rates for a plurality of flows are within a threshold amount of the expected current rates for each flow. One equation for using the current rate to allocate flows j to the same set as sharing a traffic flow constraint when all flows share the same priority is if $r_j^{[C]} >= r_j^{[sh]}$—tolerance, the flow j is added to the set;

wherein, $r_j^{[C]}$ = the current rate of flow j (obtained by counting the number of bytes received per unit time); and $r_j^{[sh]}$ = the fair share rate of flow j (obtained as the ratio of the capacity to the number of flows).

In some embodiments, one or more devices 102 can test both congestion events and bandwidth allocation. The devices 102 can determine may determine that the flows share a traffic flow constraint only if both tests show that the flows share a traffic flow constraint. Such redundancy can reduce the number of false positives in detecting share traffic flow constraints. This approach may increase the number of false negatives as well. Accordingly, in some embodiments, only one of the tests may be performed.

In some embodiments, testing for shared traffic flow constraints between flows is performed periodically (e.g., every one or more RTT). Such periodic testing may be useful as flows may change the resources used overtime, or the throughput of certain resources may change over time. Thus, the traffic flow constraint of a flow may change over time.

Figure 2:
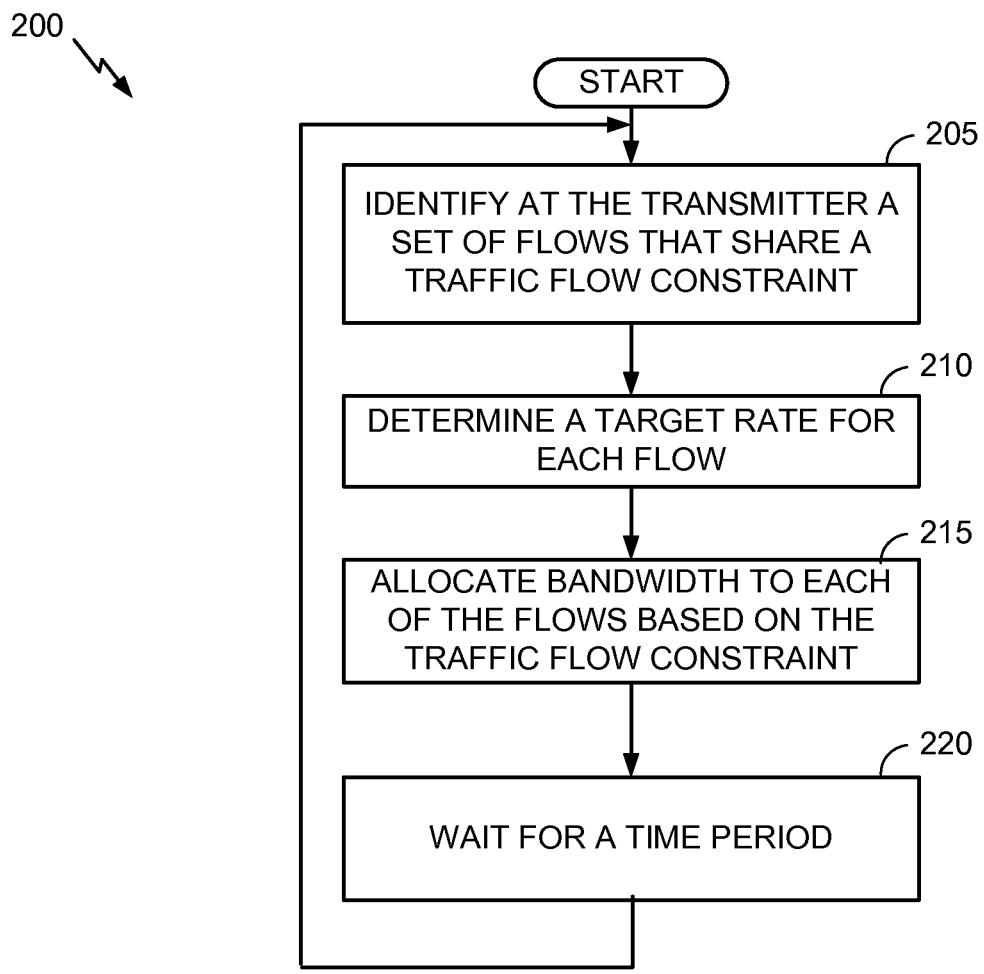
FIG. 2 is a flowchart illustrating an exemplary process for prioritizing flows at a transmitter side.

FIG. 2 is a flowchart illustrating an exemplary process 200 for prioritizing flows at the transmitter side. Starting at block 205, the transmitter identifies a set of flows from amongst a plurality of flows that share a traffic flow constraint. The transmitter may identify the set of flows based on any of the methods described above. In an embodiment, the shared traffic flow constraint can be a bottleneck, as discussed above. Continuing at block 210, the transmitter determines a target rate for each of the flows in the set of flows. The target rates may be determined as discussed herein. Further, at block 215, the transmitter allocates bandwidth to each of the flows in the set of flows based on the traffic flow constraint. In en embodiment, the transmitter can allocate bandwidth to each of the flows in the set of flows based on the traffic flow constraint, in the context of respective applications associated with each flow. In an embodiment, the transmitter may allocate bandwidth further based on an available bandwidth associated with the traffic flow constraint. In an embodiment, the transmitter may allocate bandwidth by adjusting parameters for each flow of the set of flows based on the priority of the flow. For example, different flows may be allocated different amounts of bandwidth using methods described above. Next, at block 220, the transmitter waits for a time period, such as one or more RTTs. The process 200 then returns to block 205.

Figure 3:
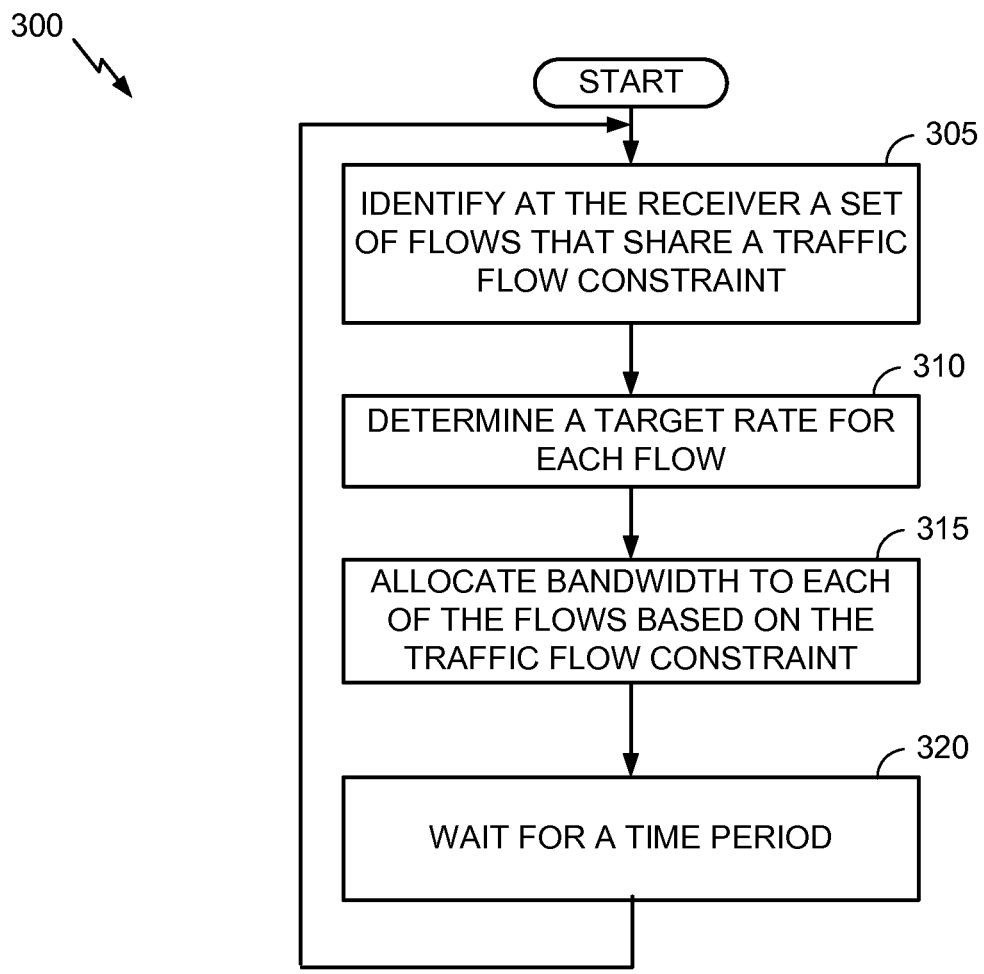
FIG. 3 is a flowchart illustrating an exemplary process for prioritizing flows at a receiver side.

FIG. 3 is a flowchart illustrating an exemplary process 300 for prioritizing flows at the receiver side. Starting at block 305, the receiver identifies a set of flows from amongst a plurality of flows that share a traffic flow constraint. The receiver may identify the set of flows based on any of the methods described above. In an embodiment, the shared traffic flow constraint can be a bottleneck, as discussed above. Continuing at block 310, the receiver determines a target rate for each of the flows in the set of flows. The target rates may be determined as discussed herein. Further, at block 315, the receiver allocates bandwidth to each of the flows in the set of flows based on the traffic flow constraint. In an embodiment, the receiver may allocate bandwidth further based on an available bandwidth associated with the traffic flow constraint. In an embodiment, the receiver may allocate bandwidth by adjusting parameters for each flow of the set of flows based on the priority of the flow. For example, different flows may be allocated different amounts of bandwidth using methods described above. Next, at block 320, the receiver waits for a time period, such as one or more RTTs. The process 300 then returns to block 305.

One or ordinary skill in the art should recognize that various steps may by added or omitted from the processes 200 and 300. Further, the various steps of the processes 200 and 300 may be performed in a different order than described above.

Figure 4:
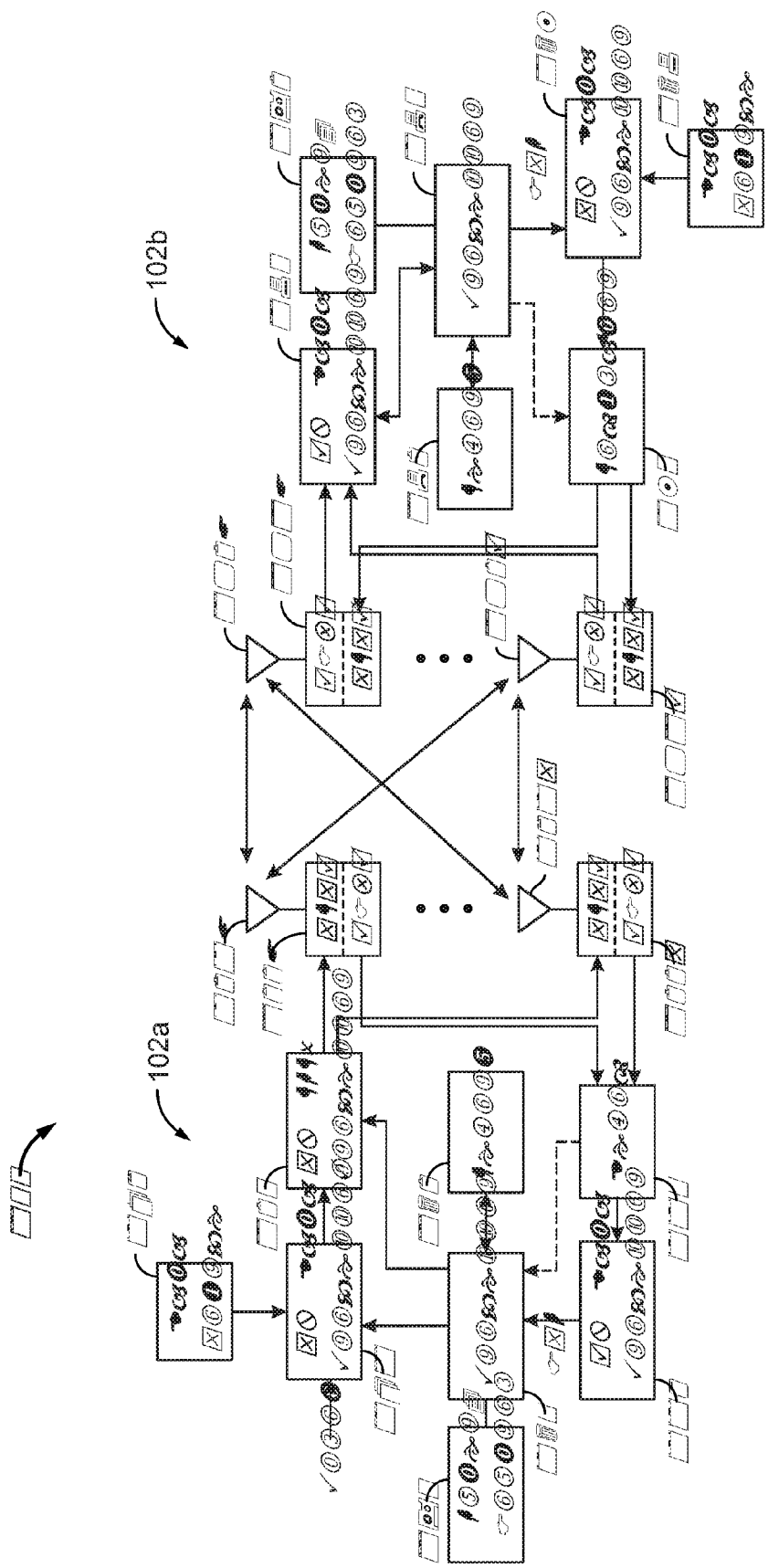
FIG. 4 is a functional block diagram of a first exemplary device and a second exemplary device that may be employed within in the communication network of FIG. 1.

FIG. 4 is a functional block diagram of a first exemplary device 102a and a second exemplary device 102b in the communication network 100 of FIG. 1. As shown, a multiple-in-multiple-out (MIMO) system 400 comprises a first device 102a and a second device 102b. A MIMO system employs multiple (NT) transmit antennas and multiple (NR) receive antennas for data transmission. A MIMO channel formed by the NT transmit and NR receive antennas may be comprise NS independent channels, which are also referred to as spatial channels, where NS≤min{NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device to extract a transmit beamforming gain on the forward link when multiple antennas are available at the device.

At the device 102a, traffic data for a number of data streams is provided from a data source 412 to a transmit ("TX") data processor 414.

In one embodiment, each data stream is transmitted over a respective transmit antenna. The TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 430. A data memory 432 may store program code, data, and other information used by the processor 430 or other components of the device 102a. Further, the processor 430 may perform the methods described herein relating to prioritization of flows.

The modulation symbols for all data streams are then provided to a TX MIMO processor 420, which may further process the modulation symbols (e.g., for OFDM). The TX MIMO processor 420 then provides NT modulation symbol streams to NT transceivers ("XCVR") 422A through 422T. In some aspects, the TX MIMO processor 420 applies beamforming weights to the symbols of the data streams and to the antenna from which the symbol is being transmitted.

Each of transceivers 422A through 422T receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 422A through 422T are then transmitted from NT antennas 424A through 424T, respectively.

At the device 102b, the transmitted modulated signals are received by NR antennas 452A through 452R and the received signal from each of antennas 452A through 452R is provided to a respective transceiver ("XCVR") 454A through 454R. Each of transceivers 454A through 454R conditions (e.g., filters, amplifies, and downconverts) a respective received signal, digitizes the conditioned signal to provide samples, and further processes the samples to provide a corresponding "received" symbol stream.

A receive ("RX") data processor 460 then receives and processes the NR received symbol streams from NR transceivers 454A through 454R based on a particular receiver processing technique to provide NT "detected" symbol streams. The RX data processor 460 then demodulates, deinterleaves, and decodes each detected symbol stream to recover the traffic data for the data stream. The processing performed by the RX data processor 460 is complementary to that performed by the TX MIMO processor 420 and the TX data processor 414 at the device 102*a*.

A processor 470 periodically determines which pre-coding matrix to use (discussed below). The processor 470 formulates a reverse link message comprising a matrix index portion and a rank value portion. A data memory 472 may store program code, data, and other information used by the processor 470 or other components of the device 102*b*. Further, the processor 470 may perform the methods described herein relating to prioritization of flows.

The reverse link message may comprise various types of information regarding the communication link and/or the received data stream. The reverse link message is then processed by a TX data processor 438. The TX data processor 438 also receives traffic data for a number of data streams from a data source 436. The modulator 480 modulates the data streams. Further, the transceivers 454A through 454R condition the data streams and transmits the data streams back to the device 102*a*.

At the device 102*a*, the modulated signals from the device 102*b* are received by the antennas 424A through 424T. Further, the transceivers 422A through 422T condition the modulated signals. A demodulator ("DEMOD") 440 demodulates the modulated signals. A RX data processor 442 processes the demodulated signals and extracts the reverse link message transmitted by the device 102*b*. The processor 430 then determines which pre-coding matrix to use for determining the beam-forming weights. Further, the processor 430 processes the extracted message.

Further, the device 102*a* and/or the device 102*b* may comprise one or more components that perform interference control operations as taught herein. For example, an interference ("INTER") control component 490 may cooperate with the processor 430 and/or other components of the device 102*a* to send/receive signals to/from another device (e.g., device 102*b*) as taught herein. Similarly, an interference control component 492 may cooperate with the processor 470 and/or other components of the device 102*b* to send/receive signals to/from another device (e.g., device 102*a*). It should be appreciated that for each device 102*a* and 450 the functionality of two or more of the described components may be provided by a single component. For example, a single processing component may provide the functionality of the interference control component 490 and the processor 430. Further, a single processing component may provide the functionality of the interference control component 492 and the processor 470.

It should be understood that FIG. 4 is just one example of a device 102. The device 102 may also comprise any suitable communication device as discussed above and may further comprise a memory for storing data and/or instructions, a processor for executing instructions and performing the methods described herein, and a transceiver (or a receiver and a transmitter) for communicating data and/or some other communication interface.

Figure 5:
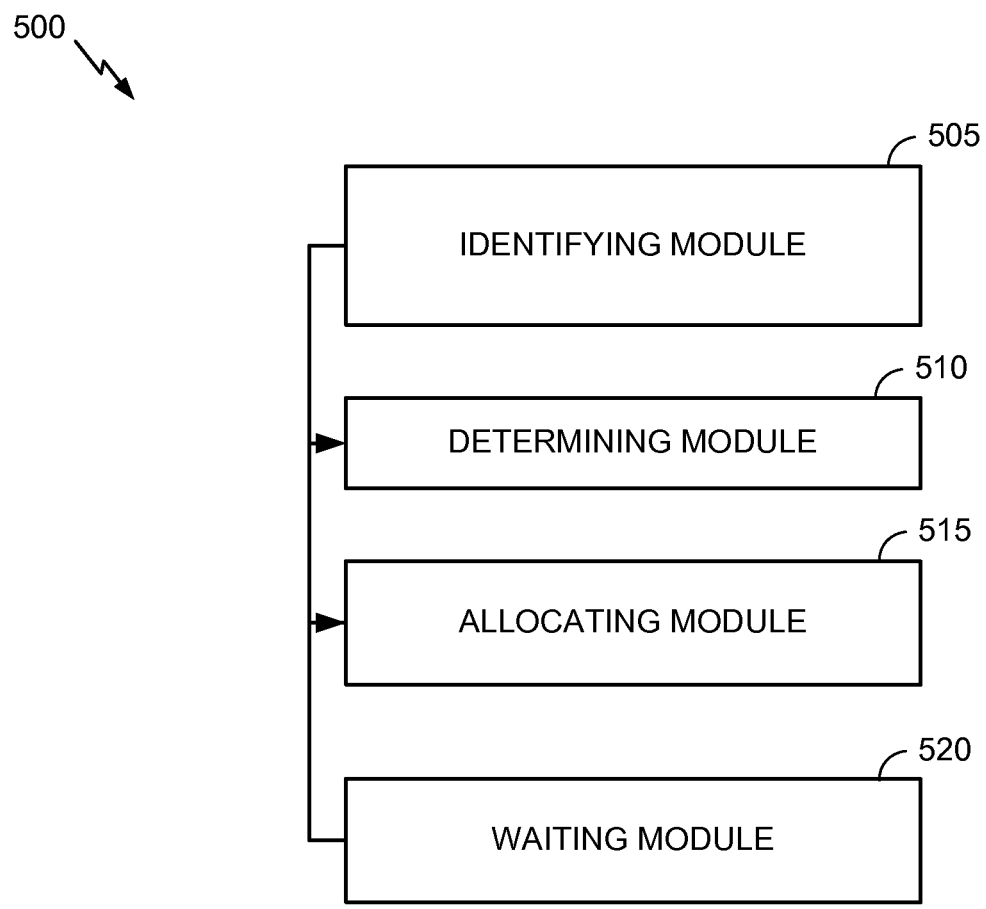
FIG. 5 is a functional block diagram of another exemplary wireless device that may be employed within the communication network of FIG. 1.

FIG. 5 is a functional block diagram of another exemplary wireless device 500 that may be employed within the communication network 100 of FIG. 1. The device 500 comprises an identifying module 505, a determining module 510, an allocating module 515, and a waiting module 520. In various embodiments, the device 500 can be any of the devices 102 discussed above with respect to FIGS. 1 and 4. For example, the device 500 can be a transmitter 102*a* and/or a receiver 102*b*. A person having ordinary skill in the art will appreciate that various embodiments of the illustrated device 500 can include additional components not shown, and can omit one or more components shown.

In the illustrated embodiment, the identifying module 505 may be configured to perform one or more of the functions discussed above with respect to the block 205 (FIG. 2) and/or the block 305 (FIG. 3). The identifying module 505 may correspond to one or more of the processor 430, the processor 470, the memory 432, the memory 472, the TX data processor 413, the TX data processor 438, the RX data processor 442, and the RX data processor 460, discussed above with respect to FIG. 4.

Referring still to FIG. 5, the determining module 510 may be configured to perform one or more of the functions discussed above with respect to the block 210 (FIG. 2) and/or the block 310 (FIG. 3). The determining module 510 may correspond to one or more of the processor 430, the processor 470, the memory 432, and the memory 472, discussed above with respect to FIG. 4. The allocating module 515 may be configured to perform one or more of the functions discussed above with respect to the block 210 (FIG. 2) and/or the block 310 (FIG. 3). The allocating module 515 505 may correspond to one or more of the processor 430, the processor 470, the memory 432, the memory 472, the TX data processor 413, the TX data processor 438, the RX data processor 442, the RX data processor 460, the XCVR 422, and the XCVR 454, discussed above with respect to FIG. 4.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A device operative in a communication network, the device comprising: a processor configured to: identify a set of flows from a plurality of flows based on a shared traffic flow constraint, wherein the set of flows comprises a first flow and a second flow; determine a first target data rate for the first flow and a second target data rate for the second flow; and allocate bandwidth to each of the flows in the set of flows based on the traffic flow constraint, an available bandwidth associated with the traffic flow constraint, the first target data rate, and the second target data rate, wherein the allocating bandwidth to each of the flows in the set of flows comprises one of: adjusting a decrease parameter associated with at least one of the flows of the set of flows, adjusting an increase parameter associated with at least one of the flows of the set of flows, adjusting a congestion window size associated with at least one of the flows of the set of flows, adjusting a receive window size associated with at least one of the flows of the set of flows, or adjusting an acknowledgment delay time associated with at least one of the flows of the set of flows, or a combination thereof.

2. The device of claim 1, wherein the processor is configured to identify the set of flows by determining whether the first flow experiences a congestion event within a threshold time period of the second flow experiencing the congestion event.

3. The device of claim 2, wherein the congestion event comprises at least one of the following: a dropped packet, an increased round trip time, a reduction in a sending rate, a reduction in instantaneous throughput.

4. The device of claim 1, wherein the processor is configured to identify the set of flows by determining whether the first flow is allocated a first expected bandwidth and the second flow is allocated a second expected bandwidth.

5. The device of claim 1, wherein the processor is configured to identify the set of flows by determining whether the first flow is allocated a first expected receiving data rate and the second flow is allocated a second expected receiving data rate.

6. The device of claim 1, wherein the processor is configured to identify the set of flows by determining whether the first flow is allocated a first expected congestion window size and the second flow is allocated a second expected congestion window size.

7. The device of claim 1, wherein the first target data rate and the second target data rate are determined based on an available bandwidth associated with the traffic flow constraint.

8. A method operative in a device operative in a communication network, the method comprising: identifying a set of flows from a plurality of flows based on a shared traffic flow constraint, wherein the set of flows comprises a first flow and a second flow; determining a first target data rate for the first flow and a second target data rate for the second flow; and allocating bandwidth to each of the flows in the set of flows based on the traffic flow constraint, an available bandwidth associated with the traffic flow constraint, the first target data rate, and the second target data rate wherein the allocating bandwidth to each of the flows in the set of flows comprises one of: adjusting a decrease parameter associated with at least one of the flows of the set of flows, adjusting an increase parameter associated with at least one of the flows of the set of flows, adjusting a congestion window size associated with at least one of the flows of the set of flows, adjusting a receive window size associated with at least one of the flows of the set of flows, or adjusting an acknowledgment delay time associated with at least one of the flows of the set of flows, or a combination thereof.

9. The method of claim 8, wherein identifying the set of flows comprises determining whether the first flow experiences a congestion event within a threshold time period of the second flow experiencing the congestion event.

10. The method of claim 9, wherein the congestion event comprises at least one of the following: a dropped packet, an increased round trip time, a reduction in a sending rate, a reduction in instantaneous throughput.

11. The method of claim 8, wherein identifying the set of flows comprises determining whether the first flow is allocated a first expected bandwidth and the second flow is allocated a second expected bandwidth.

12. The method of claim 8, wherein identifying the set of flows comprises determining whether the first flow is allocated a first expected receiving data rate and the second flow is allocated a second expected receiving data rate.

13. The method of claim 8, wherein identifying the set of flows comprises determining whether the first flow is allocated a first expected congestion window size and the second flow is allocated a second expected congestion window size.

14. The method of claim 8, wherein the first target data rate and the second target data rate are determined based on an available bandwidth associated with the traffic flow constraint.

15. A device operative in a communication network, the device comprising: means for identifying a set of flows from a plurality of flows based on a shared traffic flow constraint, wherein the set of flows comprises a first flow and a second flow; means for determining a first target data rate for the first flow and a second target data rate for the second flow; and means for allocating bandwidth to each of the flows in the set of flows based on the traffic flow constraint, an available bandwidth associated with the traffic flow constraint, the first target data rate, and the second target data rate wherein the allocating bandwidth to each of the flows in the set of flows comprises one of: adjusting a decrease parameter associated with at least one of the flows of the set of flows, adjusting an increase parameter associated with at least one of the flows of the set of flows, adjusting a congestion window size associated with at least one of the flows of the set of flows, adjusting a receive window size associated with at least one of the flows of the set of flows, or adjusting an acknowledgment delay time associated with at least one of the flows of the set of flows, or a combination thereof.

16. The device of claim 15, wherein the means for identifying the set of flows comprises means for determining whether the first flow experiences a congestion event within a threshold time period of the second flow experiencing the congestion event.

17. The device of claim 16, wherein the congestion event comprises at least one of the following: a dropped packet, an increased round trip time, a reduction in a sending rate, a reduction in instantaneous throughput.

18. The device of claim 15, wherein the means for identifying the set of flows comprises means for determining whether the first flow is allocated a first expected bandwidth and the second flow is allocated a second expected bandwidth.

19. The device of claim 15, wherein the means for identifying the set of flows comprises means for determining whether the first flow is allocated a first expected receiving data rate and the second flow is allocated a second expected receiving data rate.

20. The device of claim 15, wherein the means for identifying the set of flows comprises means for determining whether the first flow is allocated a first expected congestion window size and the second flow is allocated a second expected congestion window size.

21. The device of claim 15, wherein the first target data rate and the second target data rate are determined based on an available bandwidth associated with the traffic flow constraint.

22. A computer program product stored on a non-transitory computer-readable medium, comprising: code for causing a computer to identify a set of flows from a plurality of flows based on a shared traffic flow constraint, wherein the set of flows comprises a first flow and a second flow; code for causing a computer to determine a first target data rate for the first flow and a second target data rate for the second flow; and code for causing a computer to allocate bandwidth to each of the flows in the set of flows based on the traffic flow constraint, an available bandwidth associated with the traffic flow constraint, the first target data rate, and the second target data rate wherein the allocating bandwidth to each of the flows in the set of flows comprises one of: adjusting a decrease parameter associated with at least one of the flows of the set of flows, adjusting an increase parameter associated with at least one of the flows of the set of flows, adjusting a congestion window size associated with at least one of the flows of the set of flows, adjusting a receive window size associated with at least one of the flows of the set of flows, or adjusting an acknowledgment delay time associated with at least one of the flows of the set of flows, or a combination thereof.

23. The computer program product of claim 22, wherein code for causing the computer to identify the set of flows comprises code for causing the computer to determine whether the first flow experiences a congestion event within a threshold time period of the second flow experiencing the congestion event.

24. The computer program product of claim 23, wherein the congestion event comprises at least one of the following: a dropped packet, an increased round trip time, a reduction in a sending rate, a reduction in instantaneous throughput.

25. The computer program product of claim 22, wherein code for causing the computer to identify the set of flows comprises code for causing the computer to determine whether the first flow is allocated a first expected bandwidth and the second flow is allocated a second expected bandwidth.

26. The computer program product of claim 22, wherein code for causing the computer to identify the set of flows comprises code for causing the computer to determine whether the first flow is allocated a first expected receiving data rate and the second flow is allocated a second expected receiving data rate.

27. The computer program product of claim 22, wherein code for causing the computer to identify the set of flows comprises code for causing the computer to determine whether the first flow is allocated a first expected congestion window size and the second flow is allocated a second expected congestion window size.

28. The computer program product of claim 22, wherein the first target data rate and the second target data rate are determined based on an available bandwidth associated with the traffic flow constraint.

* * * * *